Patented July 5, 1949

2,475,261

UNITED STATES PATENT OFFICE 2,475,261

STARCH RECOVERY PROCESS

Richard L. Slotter and Justin M. Tuomy, Peoria, Ill., assignors to the United States of America as represented by the Secretary of Agriculture No Drawing. Application July 8, 1947,
Serial No. 759,684

7 Claims. (Cl. 127—69)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention details with an improved method for recovery of wheat starch, and is particularly directed to the recovery of a high quality starch from the batter method of separating starch from wheat flour. In the past few years the batter process has become of considerable economic importance, since it makes possible the production of glucose sirup from wheat flour.

Starch milk from the batter process is difficult to refine. Satisfactory recovery of the starch in a relatively pure form is difficult if not impossible by methods conventionally used for starch recovery. Sugar beet refining plants contain equipment which could be advantageously utilized for the manufacture of wheat starch and related products in off season, but heretofore no satisfactory method has been devised for the recovery of wheat starch that could be adapted to such equipment. This has been mainly due to the fact that wheat starch milk, particularly that from the batter process, is extremely difficult to filter.

An object of this invention is to provide a method whereby the starch in the starch milk is recovered in increased yield. Another object is to provide a process for the production of wheat starch substantially freed from soluble protein.

Still another object of the invention is to provide a process whereby the normally unfilterable wheat starch, as first produced in the starch milk, is converted into a product which filters easily, and wherein improved separation of starch from protein is possible.

In prior processes, wheat starch milk has been hydrolyzed directly, but due to the presence of other matter the sirup produced is dark in color and possesses an objectionable taste. The undesirable color and taste qualities are caused, for the most part, by the presence of a relatively large amount of protein in the starch milk. Approximately two-thirds of the protein contained in the starch milk from the batter process is soluble but, because of the glutinous nature of wheat protein, the slurry cannot be filtered practically. The sirup produced by direct hydrolysis without removal of the protein, is furthermore difficult to process because of excessive foaming characteristics.

It has further been proposed to table the starch milk, but this method requires a large amount of equipment, and results in a high loss of a valuable product as tailings. About 30 percent of solids containing about 8 percent protein go into the tailings fraction which are capable of producing at best only a low quality sirup.

Decantation also has been proposed, but has proved unsatisfactory and incapable of effecting a clean separation of starch from other matter. Furthermore, the use of filter aids, such as diatomaceous earth, has been proposed in an effort to filter directly the starch slurry, but it has been found that filtration of fresh batter starch results in very slow filtration rates. Even the addition of diatomaceous earth in quantities up to 5 percent, based on the total weight of the slurry, did not give substantially improved results. The addition of such quantities, furthermore, had the disadvantage of high ash content of the filter cake.

We have discovered that the starch which is normally unfilterable can be converted into filterable starch by an ageing process. The method generally consists in allowing the starch milk to settle for approximately 18 hours at room temperature, after which the supernatant liquor is decanted and fresh water is added. The resultant liquid mixture can be filtered, for example, through a plate-and-frame filter press with rates of the order of 2.4 gallons per square foot per hour and higher. The amount of water added after decantation is preferably the minimum amount necessary to form a slurry. The filter cake is removed from the press and may be processed in practically the same manner as that used for the conversion of corn starch to glucose sirup.

Wheat starch slurries, such as those produced in the batter process, have a varying analysis, depending on the flour used and other variables. In general, a typical dry basis analysis gives about 76 percent starch and ? percent protein, the protein content being about 2 parts water soluble protein and 1 part water insoluble protein. The process according to our invention accomplishes the removal of substantially all the soluble protein. In general, the starch recovered contains 1 percent or less protein and is convertible to a high quality glucose sirup.

Because most of the protein has been removed from the starch, smaller quantities of acid, filter aid, and decolorizing carbon are required in the subsequent processing than when the whole starch milk is hydrolyzed. The finished sirup is clear and almost water white; it has excellent taste qualities and is comparable to high grade corn sirup.

The invention is based on the discovery that if the starch slurry is allowed to stand at room temperature over a period of time, the pH decreases, and the filter rate increases to such an extent that filtration became commercially feasible. We have not been able to determine exactly what causes the change in the filterablility characteristics of the starch during the process of ageing. Since filtration difficulties appear to be mainly due to the soluble protein present, it is believed that the ageing results in an alteration in this protein which allows substantially complete separation of the soluble protein by filtration. During the period of ageing, we prefer to employ room temperature, but any temperature within the range of 60° to 110°. F. may be employed. The time required is within the range of 10 to 50 hours. During the ageing period the pH falls from about 7 to about 4 or less. The change in pH is accompanied by a change in the filtration time.

These changes are illustrated by the following data. The filter aid used was 1 percent diatomaceous earth.

| Run No. | Age of Starch Slurry, Hrs. | pH | Weight of Slurry (Incl. Filter Aid) Grams | Filter Time, Min. | Vol. of Filtrate, cc. | Filter Rate, Gal. Filt./ Sq. Ft./Hr. |
|---|---|---|---|---|---|---|
| 1 | 1 | 6.95 | 6,000 | 36:00 | 1,174 | 0.26 |
| 4 | 5 | 6.95 | 6,000 | 25:00 | 1,170 | 0.38 |
| 5 | 22 | 4.2 | 6,000 | 7:00 | 900 | 1.04 |
| 8 | 27 | 4.2 | 6,000 | 7:12 | 4,790 | 5.35 |

In our preferred process the batter starch slurry is allowed to age at room temperature for a time of the order of 16 to 24 hours, it is decanted, taken up with water and filtered. The filter cake is washed with about 10 gallons of water per 100 pounds of cake (dry basis). This product is then ready for hydrolysis into a high quality glucose sirup.

The following specific example is not limiting but is offered for the purpose of illustration only.

*Example*

A starch slurry from the batter process had the following typical analysis:

Volume _____gallons__ 32.4
Baumé _____degrees__ 6.3
Total solids _____pounds__ 32.2
Starch _____do____ 24.0
Total protein _____percent (dry basis)__ 2.53
Soluble protein _____do____ 1.39

To 32.4 gallons of this slurry was added 1.65 pounds of diatomaceous earth, and the slurry allowed to stand for 17 hours. It was then decanted leaving a 18.8° Bé. slurry which was filtered on a 10-inch filter press. The slurry had a filtration rate of 1.7 gallons of filtrate/sq. ft./hr. or 6.6 pounds of dry substance/sq. ft./hr. The cake was washed with 6 gallons of water and made up to a slurry having the following analysis:

Volume _____gallons__ 16.0
Baumé _____degrees__ 9.1
Total solids _____pounds__ 26.5
Starch _____do____ 23.9
Total protein _____percent (dry basis) 0.86
Soluble protein _____do____ 0.15

This slurry was converted under atmospheric conditions to sirup using 12.5 grams of 18° Bé. technical grade hydrochloric acid per pound of starch present.

The sirup was evaluated as follows:

Dextrose equivalent of sirup ____percent__ 69.6
Conversion time _____hours__ 10.0
Protein in sirup _____percent (dry basis)__ 0.49
Baumé of sirup (at 100° F.) _____degrees__ 40.0
Color of sirup _____ Very light yellow
Taste of sirup _____ Sweet For the sake of comparison, 26.5 gallons of fresh batter starch at 5.9° Bé. were converted under atmospheric conditions to sirup using 35.4 grams of 18° Bé. technical grade hydrochloric acid per pound of starch present. The slurry had the following analysis:

Volume _____gallons__ 26.5
Baumé _____degrees__ 5.9
Total solids _____pounds__ 25.1
Starch _____do____ 20.6
Total protein _____percent (dry basis)__ 3.00
Soluble protein _____do____ 1.99

The sirup was evaluated as follows:

Conversion time _____hours__ 11.0
Dextrose equivalent of sirup ____percent__ 61.9
Protein in sirup _____percent (dry basis)__ 2.67
Baumé of sirup (at 100° F.) _____degrees__ 35.3*
Color of sirup _____ Very dark brownish red
Taste of sirup _____ Bitter and salty

* Exclusive foaming prevented further evaporation.

Our process also makes possible the recovery of the soluble material contained in the liquor which is decanted from the starch milk. This material consists of starch, sugars, and soluble wheat protein. It may be used in livestock feed preparations. It is evident that our process does not require special equipment since the settling tank and filter press only are involved. The use of expensive table equipment, centrifuges, and the like is avoided, and at the same time a high quality starch containing a maximum of 1 percent protein is produced.

The use of a filter aid is not necessary, but it is preferred since it does decrease the filtering time to a certain extent. It may be left in the cake and used again in the step of purifying the glucose sirup after the hydrolysis treatment.

In the batter process wheat flour is first made into a batter with water. It is then stirred or agitated for a short while, for example, 10 to 20 minutes. Then water is added to make up about one to one and one-half times the volume of the batter. A slurry results which contains curds of gluten, and this slurry is screened, effecting separation of the gluten and starch milk.

Although we have described our process with particular reference to starch milk from the batter process, it may also be carried out with starch milk obtained from flour by other processes, for example, the well-known Martin process in which wheat flour is made into a dough with water, kneaded, and washed to separate the aqueous starch milk. A batter consists of flour and water thin enough to pull or drop from a spoon, and a dough is a soft mass of moistened flour or meal thick enough to knead or roll.

Having described the invention, we claim:

1. A method for recovering wheat starch from aqueous wheat starch slurries containing appreciable amounts of soluble protein, the wheat starch slurry being derived by treating wheat flour with water and separating the aqueous starch milk from the wheat gluten, which comprises ageing said slurry for a period in the range of 10 to 50 hours, the pH falling below 7 in the ageing decanting the supernatant liquid, washing the settled starch and filtering.

2. Process according to claim 1 in which diatomaceous earth is added during the ageing period.

3. Process according to claim 1 in which the ageing is conducted at room temperature.

4. A method of recovering wheat starch comprising mixing wheat flour to a batter with water, agitating, diluting the batter with water, separating aqueous starch milk from the gluten, ageing the aqueous starch at about 60° to 110° F. for a period of 10 to 50 hours, whereby the pH falls to about 4 or lower and the filtration rate is increased, decanting the supernatant liquid, adding water to the settled starch, and filtering the starch.

5. The process of claim 4 in which the temperature is room temperature.

6. The process of claim 4 in which diatomaceous earth is employed in the filtering step.

7. In a method of recovering wheat starch from aqueous wheat starch slurries containing soluble protein, the wheat starch slurry being derived by treating wheat flour with water and separating the aqueous starch milk slurry from the wheat gluten, the step which comprises converting the normally unfilterable aqueous starch slurry into a filterable starch slurry by allowing it to stand for a period within the range of 10 to 50 hours at 60° to 110° F., the pH falling below 7 in the ageing, adding water to form a slurry and filtering the slurry.

RICHARD L. SLOTTER.
JUSTIN M. TUOMY.

REFERENCES CITED

The following references are of record in the file of this patent:

UNITED STATES PATENTS

| Number | Name | Date |
|---|---|---|
| 725,180 | Uhland | Apr. 14, 1903 |
| 1,013,497 | Klopfer | Jan. 12, 1912 |
| 2,418,621 | Callahan et al. | Apr. 8, 1947 |